United States Patent [19]

Miyake

[11] Patent Number: 4,698,702

[45] Date of Patent: Oct. 6, 1987

[54] PLAYBACK APPARATUS FOR ROTARY RECORDING MEDIUM

[75] Inventor: Izumi Miyake, Kaisei, Japan

[73] Assignee: Fuji Photo Film Co., Ltd., Kanagawa, Japan

[21] Appl. No.: 739,853

[22] Filed: May 31, 1985

[30] Foreign Application Priority Data

May 31, 1984 [JP] Japan .................. 59-109586

[51] Int. Cl.$^4$ .................. H04N 5/781; G11B 21/08
[52] U.S. Cl. .................. 360/33.1; 360/78; 360/74.4; 358/907; 369/33; 369/41; 369/50
[58] Field of Search .................. 360/33.1, 78, 74.4, 360/35.1; 358/342, 310, 907; 369/32, 33, 41, 50, 111

[56] References Cited

U.S. PATENT DOCUMENTS

| | | | |
|---|---|---|---|
| 4,106,058 | 8/1978 | Romeas | 369/32 |
| 4,138,663 | 2/1979 | Lehureau | 369/32 |
| 4,175,270 | 11/1979 | Zenzefilis | 358/310 |
| 4,519,057 | 5/1985 | Higashihara | 369/32 |

*Primary Examiner*—Alan Faber
*Attorney, Agent, or Firm*—Birch, Stewart, Kolasch & Birch

[57] ABSTRACT

Playback apparatus for a rotary recording medium includes a playback head for sensing signals from a plurality of tracks which are formed on a rotary recording medium in such a manner that the front end of recording operation continues to the last end thereof; a head move unit for movably supporting the playback head; an envelope detect device for detecting an envelope of signals sensed by the playback head; and a control unit for controlling the head move unit to move the playback head to a desired one of the plurality of tracks based on the detected envelope. The control unit, in order to control the head move unit to move the playback head in a first direction, is adapted to count the distance moved by the playback head with reference to a predetermined reference position, and to control the head move unit to move the playback head in a second direction opposite to the first direction when an envelope is not detected successively at track positions associated with a predetermined number of tracks.

10 Claims, 17 Drawing Figures

PLAYBACK APPARATUS FOR ROTARY RECORDING MEDIUM

BACKGROUND OF THE INVENTION

1. Field of the Invention

The present invention relates to a playback apparatus for a rotary recording medium, and in particular to a playback apparatus for a rotary recording medium for reproducing information signals such as video signals representing a still picture recorded on a rotary magnetic recording medium such as a magnetic disk.

2. Description of the Related Art

There has been recently developed an electronic still camera system including an image pickup device, such as a solid-state image pickup device or tube, and a recorder utilizing as a recording medium a low-price magnetic disk having a relatively large recording capacity, in which an electronic still picture of an object is recorded on a rotating disk, and the recorded picture is reproduced by use of a separate television system, a printer, or the like.

However, recording media utilized in such magnetic recording, especially magnetic disks are likely to cause a tracking failure due to the anisotropy, eccentricity, thermal expansion, and the like. Consequently, a track adjacent to the track to be scanned for the reproduction is erroneously scanned, which results in crosstalk of signals reproduced.

In order to overcome this difficulty, there has been adopted a method in which the tracking servo is applied when recording information so as to record tracking signals. The tracking servo is effected by use of the recorded tracking signals when reproducing the information. However, a tracking servo mechanism requiring a precise control cannot be practically incorporated in a light-weight, compact recording apparatus such as a camera.

There has been a method utilizing a guard band system or an FM azimuth system as a recording scheme so as to compensate for above-stated operations. That is, the playback head is prevented from scanning the adjacent wrong track due to a slight tracking failure during the playback, and the signals, even though scanned on the adjacent track, could be blocked.

On the other hand, there has been utilized a method called an envelope peak detecting autotracking system. In accordance with this system, the recording head is moved with a predetermined pitch by use of a stepping motor without tracking servo when recording information, whereas an envelope of the output signals reproduced from a track is detected and the optimum track position is identified based on the peak position of the envelope, thereby accomplishing the tracking servo on the operation for reproducing the recorded signals.

In an electronic still camera system, a rotary magnetic recording medium used includes, for example, a magnetic disk of which the diameter is about 50 mm, and the track pitch, track width, and guard band width are selected to be about 100 μm, 50 μm to 60 μm, and 40 μm to 50 μm, respectively, in order to record information of 50 tracks of the disk surface. When installed in a recording or playback apparatus, a magnetic disk is rotated at a constant rotating rate of, for example, 3,600 revolutions per minute (rpm) so as to record or reproduce image signals at a field or frame rate.

Such a thin, compact magnetic disk having a relatively small diameter is usually housed in a mold package made of materials such as plastic. That is, the disk package is installed in a disk mounting unit of a recording or playback apparatus, and is rotated in the same state for recording or reproducing information.

In order to select an appropriate track in a playback operation, it is required to correctly identify and to display tracks or the track numbers thereof.

In a recording unit, when a signal dropout occurs on a track of a magnetic disk, the track is skipped to record information on the next appropriate track in some cases. Consequently, in a playback unit so configured as to identify a track number simply based on the distance traveled by the playback head, a faulty track on which video signals have not been recorded is recognized to be a valid track, and the track number of this track is thus displayed. This may become inconvenient in the operation of a playback device which rapidly selects and displays a picture associated with a desired frame number.

Even if the playback head is moved onto such an unrecorded track when reproducing signals from a magnetic disk, not fully recorded up to the limit of the disk capacity, by use of a playback device reproducing the recorded information by skipping the unrecorded track, the playback head can be continuously moved until it reaches a mechanical limit position for the head travel. This may cause the associated mechanism to be damaged unless certain control is provided to the playback head movement.

SUMMARY OF THE INVENTION

It is therefore an object of the present invention to provide a playback apparatus for a rotary magnetic recording medium for appropriately selecting a desired picture without causing the playback head to be continuously moved to the unrecorded track area on a magnetic disk.

According to the present invention, there is provided a playback apparatus for a rotary recording medium comprising: playback head means for sensing signals from a plurality of tracks which are formed on a rotary recording medium in such a manner that the front end of recording operation positionally continues to the last end thereof; head move means for movably supporting said playback head means; envelope detect means for detecting an envelope of signals sensed by said playback head means; and control means for controlling said head move means to move said playback head means to a desired one of the plurality of tracks based on the detected envelope; said control means, in order to control said head move means to move said playback head means in a first direction, counting the distance moved by said playback head with reference to a predetermined reference position, and controlling said head move means to move said playback head means in a second direction opposite to the first direction when an envelope is not detected successively at track positions associated with a predetermined number of tracks.

In this context, the words "a plurality of tracks formed on a rotary magnetic recording medium in such a manner that the front end of a recording operation positionally continues to the last end thereof" include the track configuration of, for example, tracks formed concentrically about the rotation axis of a magnetic disk or those formed in parallel to each other circumferentially on a magnetic drum, that is, tracks which are formed by a magnetic head to read information without changing the relative position thereof to a rotating magnetic recording medium.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

An embodiment of the present invention will be described by referring to the accompanying drawings.

Figure 1:
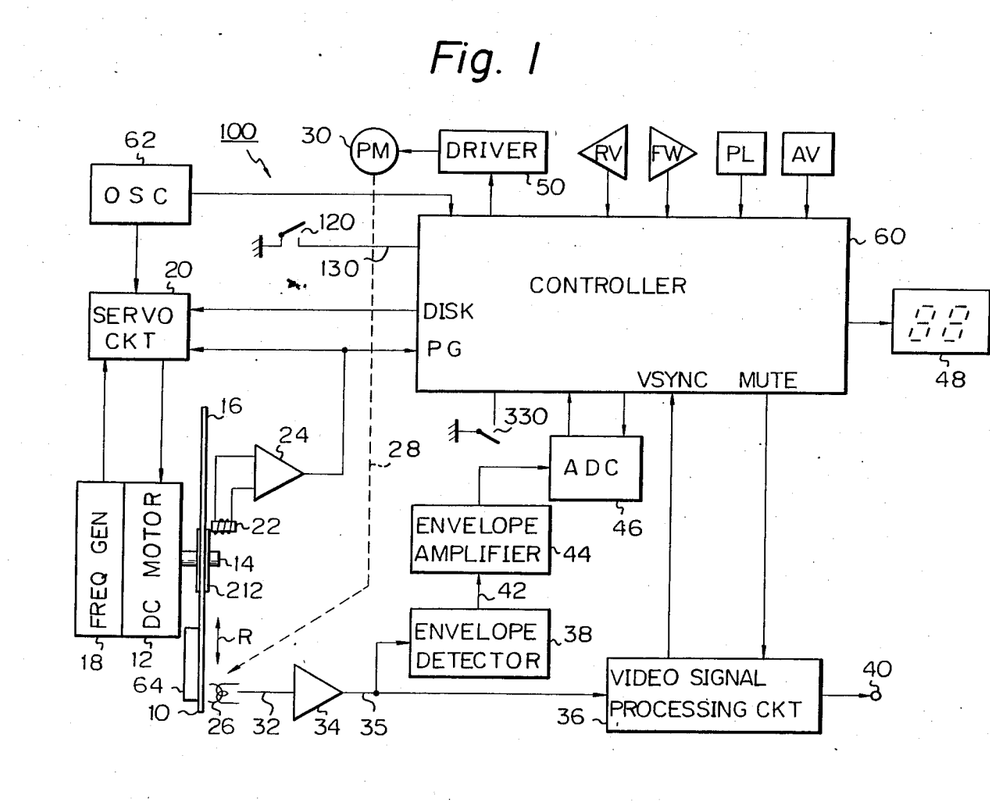
FIG. 1 is a schematic circuit block diagram illustrating an embodiment of playback apparatus for a rotary recording medium in accordance with the present invention.

In an apparatus of FIG. 1 embodying the present invention, a rotary recording medium 10, such as a magnetic disk, is detachably mounted on a spindle 14 driven by a direct current (DC) or spindle motor 12. The magnetic disk 10 of this embodiment comprises a sheet including a magnetic recording material and having a diameter of about 50 mm. The disk 10 has a recording surface 16 on which, for example, 50 concentric recording tracks may be formed with a pitch of about 100 μm. Signals recorded on tracks may, in this embodiment, include video signals, which may be color video signals including frequency-modulated luminance, chrominance, and synchronizing signals. The video signals may be recorded on a track in the form of a field of video signals forming a field of image in a raster scanning fashion.

The DC motor 12 comprises a frequency generator 18 for generating an alternate current (AC) frequency signal and is powered by a servo circuit 20 so as to be controlled to drive the disk 10 to rotate at a fixed rotation rate, for example, 3,600 rpm. The servo circuit 20 is connected to a controller 60 controlling the overall operation of this apparatus. The servo circuit 20 dowes or stops the rotation of the disk 10 in response to a signal, DISK.

A phase generator 22 disposed at a predetermined location in the vicinity of the recording surface 16 of the disk 10 is connected via an amplifier 24 to the servo circuit 20 and the controller 60. A timing mark or indicium provided at a predetermined position on the recording surface 16 can be thus sensed to generate a timing pulse, PG.

A magnetic transducer, that is, a magnetic head 26 disposed over the recording surface 16 is carried by a support mechanism 28. As conceptually illustrated by a dotted line 28, the support mechanism is driven by a stepping motor (PM) 30 and radially moves the head 26 in both directions over the recording surface, thereby enabling an arbitrary track on the recording surface to be selected.

Although the magnetic head 26 may have a magnetic recording function, this embodiment contemplates a magnetic head which has a playback function for sensing video signals recorded on a track of the recording surface 16 and converting the video signals into the associated electric signals. As described before, since the disk 10 of this embodiment rotates at a constant rotation rate of 3,600 rpm, a track of video signals, that is, a field of video signals undergone the frequency modulation are reproduced by the magnetic head 26 for each disk rotation or 1/60 second. When subjected to demodulation, these signals become compatible with the standard color television format such as the NTSC format.

The magnetic head 26 has a sensor output 32 connected via a preamplifier 34 to a video signal processing circuit 36 and an envelope detect circuit 38. The video signal processing circuit 36 processes video signals sensed by the magnetic head 26, for example, in order to deliver the resultant signals in the form of composite color video signals in the NTSC format to an output of the apparatus. This circuit demodulates the video signals and extracts the vertical sync signal, VSYNC, from the demodulated composite color video signals in the NTSC format to supply the obtained VSYNC to the controller 60. It receives a signal, MUTE, from the controller 60 and fills the effective horizontal scanning period of the video signal with blank signals so as to perform the muting operation. The function of converting the signal format into the standard format as described above is not an indispensable function of this apparatus, that is, the processing circuit 36 may only have a synchronous extract function for synchronously extracting desired signals from the video signals sensed by the magnetic head 26, and an output function for delivering the obtained signals to the terminal 40 under control of the controller 60.

The envelope detect circuit 38 detects the envelope of the FM video signals recorded on a track of the recording surface to supply an output 42 with a voltage associated with the detected envelope. This circuit is connected via an envelope amplifier 44 to an analog-to-digital converter (ADC) 46. The ADC 46 having 256 quantization levels in this embodiment converts signals into 8-bit data representative of the levels in accordance with instructions from the controller 60 to feed the obtained data to the controller 60.

As will be described later, the controller 60 supervises the control of the overall apparatus according to the operation conducted by the operator, and is advantageously configured by use of a microcomputer system, for example.

In this embodiment, there are provided a playback (PL) key for initiating and terminating the operation of the apparatus, a forward (FW) key for moving the magnetic head 26 in the forward direction with respect to the track numbers (for example, from the outer track to the inner track), and reverse (RV) key for moving the magnetic head 26 in the reverse direction, these keys being connected to the controller 60. A track number entered by use of the FW or RV key is displayed on a display device 48, such as a photodiode indicator or a CRT display, connected to the controller 60. Obviously, the display device may be provided with an audible alarm device to supply an audible indication, for example, an alarm.

The stepping motor 30 is a 4-phase drive pulsating motor in this embodiment and it is rotated about 15° in response to a drive pulse supplied thereto. Consequently, the rotor thereof makes a complete rotation with 24 drive pulses. The head support mechanism 28 is so configured as to move the magnetic head 26 by about 4.2 μm in the direction of arrow R when a pulse is supplied to the stepping motor 30. The exciting duration of a pulse is, for example, about two to three ms, and hence the magnetic head 26 is moved by approximately 100 μm with 24 pulses.

The drive pulse is supplied from a drive circuit 50 comprising a current amplifier. The drive circuit 50 generates a pulse for driving an excitation coil winding of the stepping motor 30 in accordance with an excitation pattern specified by the controller 60.

The controller 60 and the servo circuit 20 are responsive to reference clock signals generated by a reference oscillation generator (OSC) 62. In this embodiment, the servo circuit 20 is supplied with a reference signal having a frequency of 60 Hz, which is equal to the field frequency of the raster scan video signal to be recorded on the magnetic disk 10, whereas the controller is supplied with a clock signal having a higher frequency of 3.58 MHz.

Figure 2:
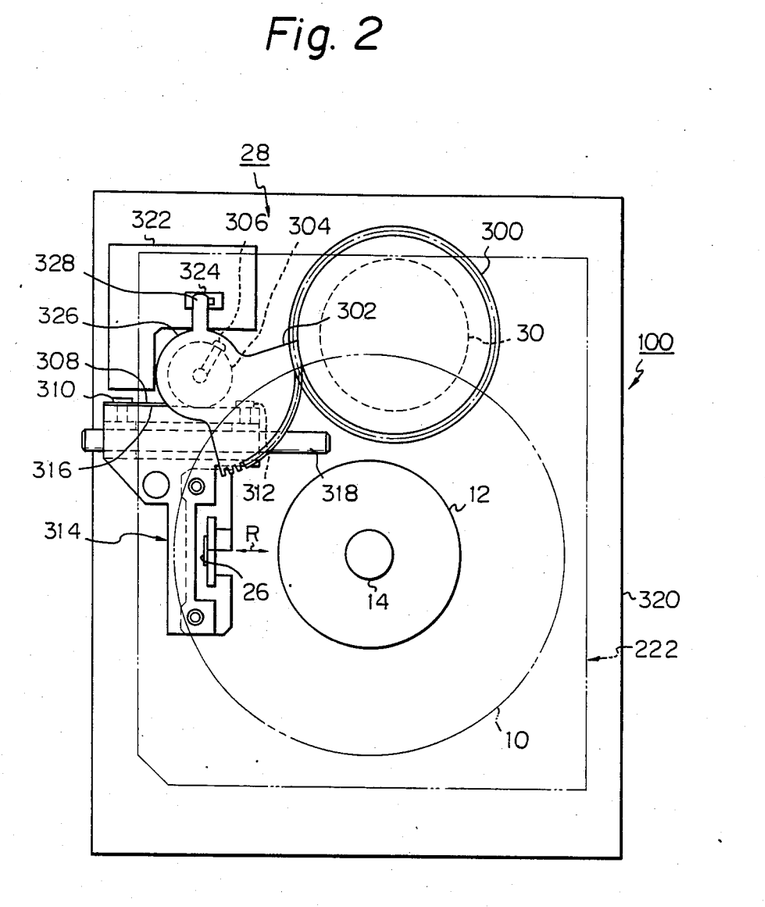
FIG. 2 is a plan view depicting the mechanical configuration of the embodiment of the apparatus.

As shown in FIG. 2, the head move mechanism 28 of the apparatus 100 comprises a deceleration mechanism 300 having an output stage engaged with a sector gear 302. A pulley 304, which rotates together with the sector gear 302, is mounted thereon. A wire 308 is fixed to the pulley 304 at a point by use of retaining means 306. The ends of the wire 308 are fixed on a side surface 316 of a head carriage 314 by use of retaining means 310 and 312. The magnetic head 26 is supported by the head carriage 314, so that this configuration allows the head carriage 314 to slide on a guide rod 318 in the direction of arrow R according to the driving action of the motor 30.

When the magnetic disk 10 housed in a package 222 is installed in the apparatus 100, a core 12 of the disk is linked to the spindle 14 and the magnetic head 26 is moved in the radial direction R over the disk 10. The outer-most position of the head travel as shown in FIG. 2 is sensed by a limit switch 324 disposed on a member 322 fixed to a cabinet 320 of this apparatus 100. That is, a protruding arm 328 is disposed in a location of a circular portion 326 of the sector gear 302, and when the magnetic head 26 is moved approximately to the outer-most position, that is, the home position HP, FIG. 3, of the head 26, the arm 328 is brought into contact with a movable member of the switch 324 to close a contact point 330, FIG. 1, by pushing the movable member.

Figure 3:
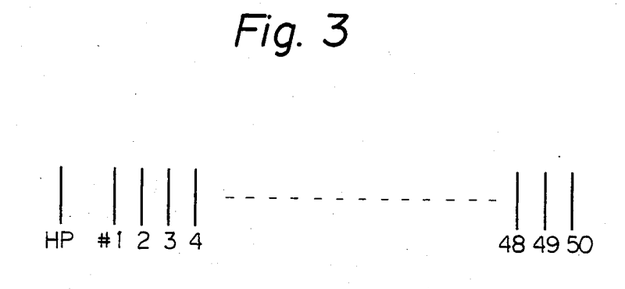
FIG. 3 is an explanatory diagram showing the track layout on a magnetic disk applicable to the apparatus.

In this embodiment, the tracks of the magnetic disk 10 are numbered in the ascending order in the direction from the outer-most track to the inner-most track as depicted in FIG. 3, and the home position (HP) of the magnetic head 26 is set to a position outside the outer-most track, i.e. track #1. Track selection or tracking control is carried out by counting the number of tracks, that is, the number of the envelope peaks during the head travel in reference to the reference position or the home position (HP), which will be described in detail below.

The tracking operation in accordance with the envelope peak detecting autotracking control is performed as follows. First of all, assume that the magnetic head 26 has been positioned on a track. When the FW or RV key is actuated, the controller 60 causes the drive circuit 50 to initiate the stepping motor 30 so as to move the magnetic head 26 in the forward or reverse direction, when appropriate.

In this embodiment, the magnetic head 26 is first moved in the forward or reverse direction by a distance, about 96 μm associated with 23 pulses, which is slightly less than the track pitch, 100 μm, for example. The signals read by the magnetic head 26 during this operation are detected by the envelope detect circuit 38 to be converted into the associated digital data by the ADC 46, which delivers the resultant signals to the controller 60. Then, the controller 60 further moves the magnetic head by a pulse and detects the level of the envelope of signals obtained by the magnetic head 26, then compares the envelope level with the previous envelope level.

The controller 60 detects and compares the envelope levels while moving the magnetic head 26 as described above, thereby determining the peak position of the envelope. When the envelope peak is determined, the head 26 is properly positioned on the appropriate track. In this manner, the controller 60 carries out the tracking operation in accordance with the envelope peak detecting autotracking control.

In order to locate the magnetic head 26 at the nominal position according to the envelope peak detecting autotracking control, it is desirable to return the magnetic head 26 to the home position (HP) by the time to initiate the tracking operation.

When this apparatus becomes powered, or when the inner bucket in which a magnetic disk package 200 is to be installed is opened to break a contact point 120 responsive to the action of the inner bucket, the controller 60 causes the drive circuit 50 to start the stepping motor 30 so as to move the magnetic head 26 in the reverse direction, that is, radially toward the outer-most track, thereby returning the magnetic head 26 to the home position (HP).

During the operation described above, the controller 60 scans the keys at an interval of about 1V period (field period) in order to monitor the state of a switch 330, where "V" represents a period of vertical scanning. If it is sensed by the monitoring operation that the switch 330 has been closed, that is, if the arm 328 of the sector gear 302 has been brought into contact with the switch 324 to enable the switch 32, then the controller 60 instructs the drive circuit 50 to stop driving the motor 30. Then, the magnetic head 26 is assumed to have been restated to the home position (HP). The controller 60 clears to zero the counter for counting the number of tracks, that is, the head travel distance. Because of the error in determining the mechanical position of the limit switch 324, the head 26 may stop at the home position with a considerable allowance.

Figure 5A:
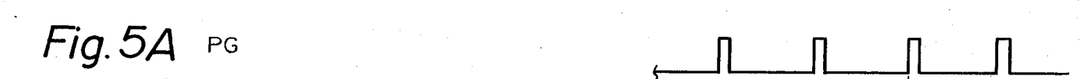
FIGS. 5A-5F show the operational timings of the control unit of the embodiment depicted in FIG. 1.
Figure 5B:
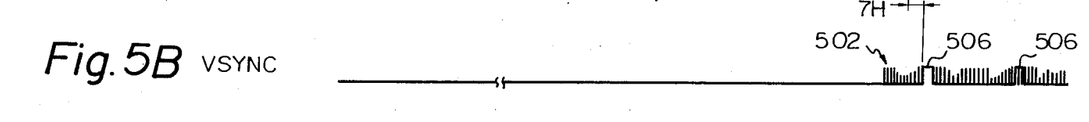
Figure 5C:
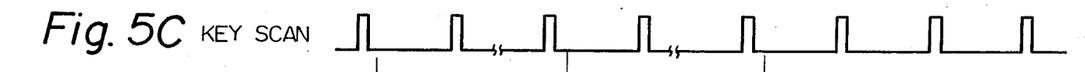

As illustrated in the timing charts of FIGS. 5A–5F, the key scanning operation is carried out at an interval of about 1V period in this embodiment, FIG. 5C. The signal is generated by the controller 60 based on the clock signal supplied from the reference oscillation generator 62, and is utilized as the timing signal which is the reference for the operation of the controller 60 until the magnetic disk 10 is set to the constant or stationary rotation.

Figure 5D:
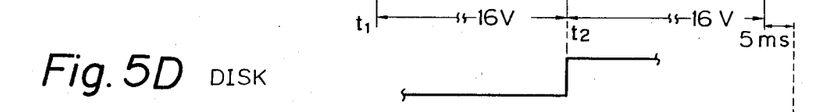
Figure 5E:
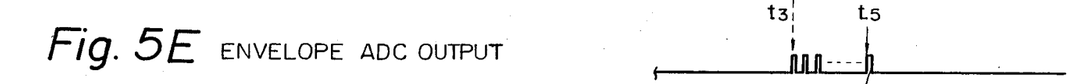
Figure 5F:
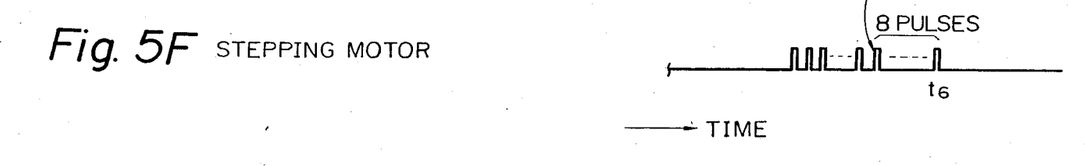

At time t1, FIGS. 5A-5F, for example, if the controller 60 determines that a contact point 120 has been closed and identifies that the magnetic disk 10 has been installed in an appropriate position, it enables a control line, DISK, after 16 V period is elapsed (at time t1), and causes the servo circuit 20 to rotate the spindle motor 12 at a constant revolution rate, FIG. 5D. When the motor rotation reaches the predetermined revolution rate, the signal PG is extracted from the pulse generator 22 in synchronism with the rotation. Once the signal PG is set to the stationary state, the controller 60 operates thereafter with reference to the PG signal in place of the key scan signal.

Figure 4:
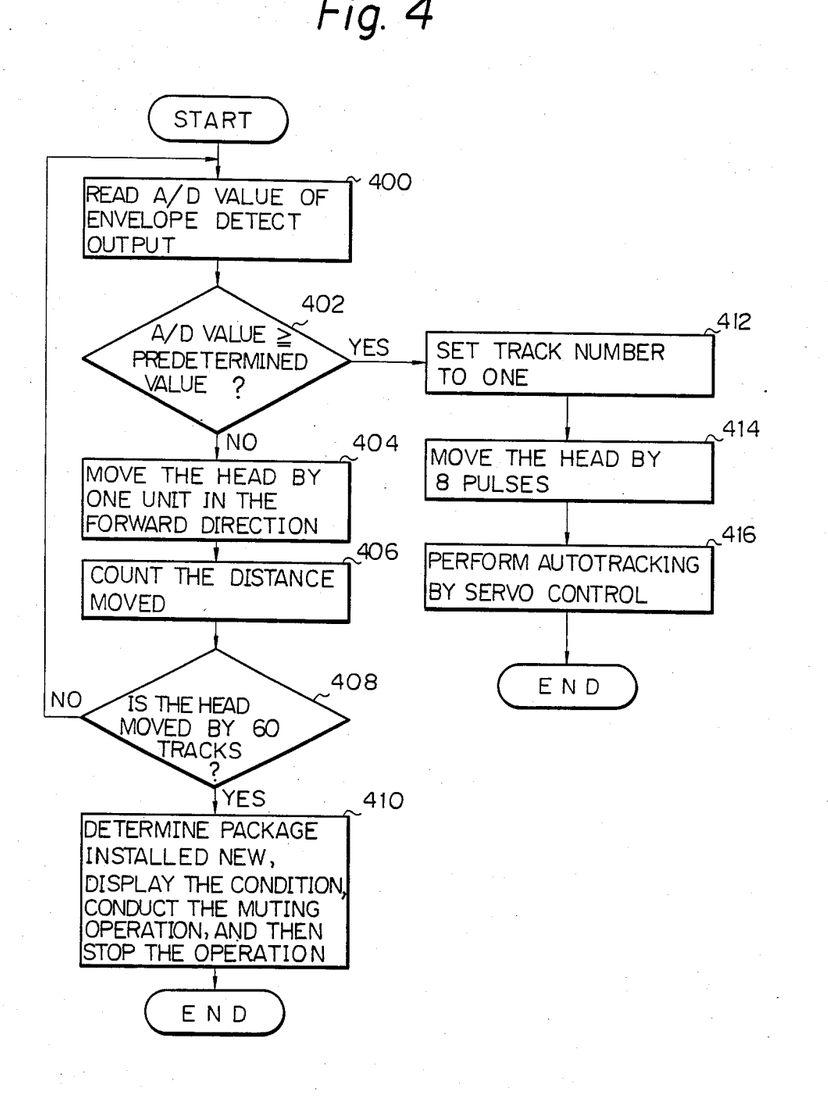
FIG. 4 is an operation flowchart illustrating exemplified operations of the control unit in the embodiment of FIG. 1.

As described above, if the FW key is actuated while the contact point 330 is closed with the magnetic head 26 returned to the home position (HP), the controller 60 operates according to the flowchart shown in FIG. 4. When a predetermined period of time is elapsed after the signal, DISK, is enabled, that is, at time t3, the controller 60 commences reading the value (A/D converted value) of the envelope obtained from the ADC, step 400 in FIG. 4.

Figure 6:
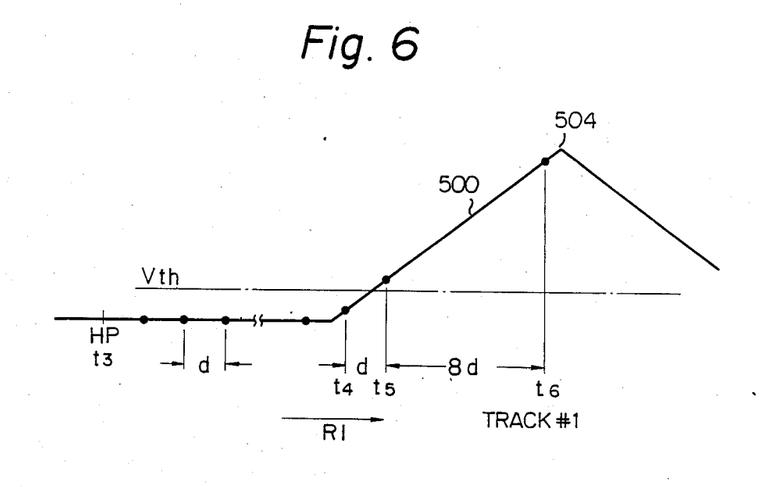
FIG. 6 is an explanatory diagram useful for understanding operations of the apparatus for sensing the first track.

When the controller 60 senses actuation of the FW key during an input scanning operation, it moves the magnetic head 26 in the forward direction R1 by one unit of distance, d, FIG. 6. The distance, d, may be set to be equivalent to a pulse of the stepping motor 30 (for example, about two to three milliseconds) or several pulses thereof. During this operation, the controller 60 counts one unit of distance, d, travelled by the magnetic head 26, step 406. The counting operation is performed to determine whether or not the magnetic head 26 has been moved by a distance equivalent to the track pitch.

In this manner, control passes through a loop from step 400 to step 408 so as to monitor the level of the envelope at each position to which the magnetic head 26 is moved by one unit of distance, d, in the forward direction.

As schematically shown in FIG. 6, as the magnetic head 26 is moved from the home position (HP) thereof toward track #1, the signals associated with the envelope conceptually depicted by a real line 500 are recorded on the magnetic disk 10. Each time the controller 60 moves the magnetic head 26 by one unit, d, in the forward direction R1, it detects the envelope of the signals obtained from the head 26 at a position indicated by a dot in the figure. During a short period of time after the head 26 is moved from the home position (HP), the level of the envelope sampled as described above does not exceed the predetermined value, namely, a threshold value Vth, and hence control passes through the processing of the loop shown in FIG. 4.

For example, the level does not exceed the predetermined value Vth at time t4; however, if it exceeds the value at time t5, the controller 60 assumes that the magnetic head 26 is in the vicinity of track #1. Control therefore branches from step 402 to step 412 so as to set the counter for counting the track number to one. Then, video signals recorded on track #1 are allowed to be supplied through the magnetic head 26 to the video signal processing circuit 36 as indicated by reference numeral 502 in FIG. 5B.

The controller 60 then instructs the drive circuit 50 to move the magnetic head 26 by a predetermined number of pulses, for example, eight pulses, step 414. If it is detected that the envelope level exceeds the predetermined value Vth at time t5, the magnetic head 26 is assumed to be in the vicinity of the first track during the forward movement of the head 26. Consequently, it is probable that an envelope peak 504 may exist in the neighborhood of a position apart from above-mentioned position by a predetermined distance in the forward direction.

The predetermined number of pulses is thus set to be equivalent to the distance from the position at which the value Vth is exceeded on an ordinary envelope waveform to a position in the vicinity of the envelope peak. Contrarily, the number of pulses, that is, the distance from a peak of the envelope 500 to a point in the vicinity of the end thereof may be first established, and then the threshold value Vth can be specified accordingly. The threshold valve Vth is set to a level for which the envelope can be significantly detected with consideration to variations and fluctuations in noise and parameters of the circuitry.

In this embodiment, one unit of head travel distance, d, is set to be equivalent to a pulse, while the predetermined distance described above is set to be equivalent to eight pulses, that is, 8d. The threshold value Vth is selected to be slightly less than the envelope level obtained at a position displaced by the distance 8d from the peak 504 on the ordinary envelope waveform 500.

In order to advantageously control the motor 30, the distance to move the magnetic head 26 after the envelope level is significantly detected is set to be an integer multiple of the unit of head travel conducted before the envelope level is detected, that is, an integer multiple of distance equivalent to a pulse. For the envelope peak detecting autotracking control, step 416, to be executed later, the distance is advantageously set to be slightly less than the distance from the position of the peak 504 on the envelope waveform 500 to the position at which the envelope level exceeding the threshold value Vth is detected.

The video signals reproduced by the magnetic head 26 contain the vertical sync signal, VSYNC, 508 beginning from a time point in the neighborhood of time t5 as shown in FIG. 5B. In this embodiment, the VSYNC 508 is set to be apart from the pulse signal, FIG. 5A, generated by the phase generator 22 by 7H.

As described hereabove, the controller 60 moves the magnetic head 26 while monitoring the envelope level. During the head travel, the controller 60 counts the distance travelled by the magnetic head 26 in terms of the track pitch or the head travel unit, step 406. If the envelope level exceeding the threshold value Vth is not detected even when the magnetic head 26 is moved over the magnetic disk 10 beyond the track range in which information can be recorded; in this embodiment, for example, if such an envelope level is not found even when the magnetic head 26 is moved by 60 tracks with the track range set to be 50 tracks, then the magnetic disk 10 is determined to be a new or virgin disk on which information has not been recorded, step 408. In this case, the controller 60 displays the condition on the display device 48 and enables the signal, MUTE, so as to mute the video signals, then terminates the operation of the system, step 410.

In this embodiment as described above, if a significant envelope level is detected when moving the magnetic head 26 from the home position (HP) thereof to the first track, the magnetic head 26 is moved from the position by the predetermined distance, for example, 8d, in order to rapidly reach a position in the vicinity of the peak 504 of the envelope 500 associated with the track #1. Then, the envelope peak detecting autotracking control is applied to the tracking operation with the magnetic head 26 located at a position in the vicinity of the objective track position.

In a magnetic recording medium, such as a magnetic disk, a record signal dropout may take place due to defects in a layer of magnetic substance on the recording surface thereof. For example, in a case where a video software supplier provides users with magnetic disks on which images are recorded, if a signal dropout occurs on a track of such a disk with a recording device they use, the recording device may be adapted to skip that track on the next appropriate or flawless track for the recording operation.

In this operation, the track skipped is advantageously recorded with an erase carrier or carriers having a frequency sufficiently higher than the frequency band of the recording carrier utilized for the FM signal recording operation. This provision allows the apparatus to be applied to a monochrome signal playback system requiring only the luminance and synchronous signals.

If the signal dropout takes place on a predetermined number of consecutive tracks, for example, two tracks, then the disk may be specified to be absoluted. If the video signals are recorded on the magnetic disk in this manner, the skip distance between tracks recorded with video signals is at most one track.

When reproducing information on the magnetic disk 10 by use of the playback device 100, such a skipped track is also skipped during the signal reproduction.

Figure 7:
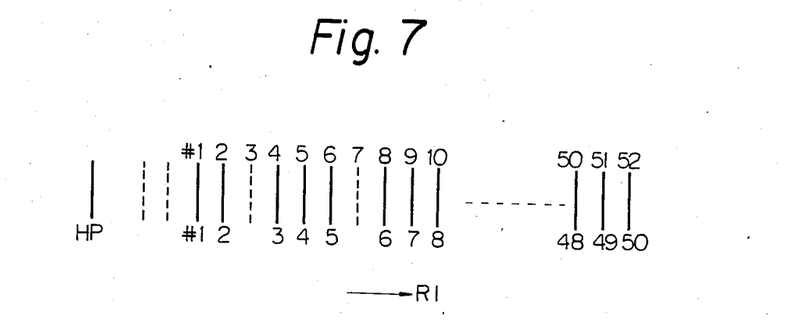
FIGS. 7-9 illustrate the track configuration for recording or reproducing signals on a magnetic disk applicable to the apparatus.
Figure 8:
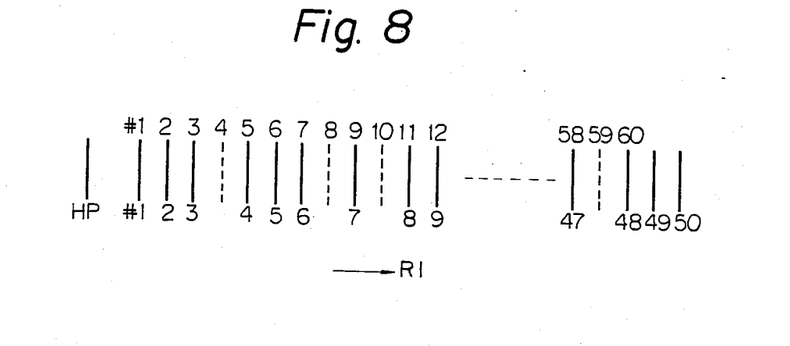
Figure 9:
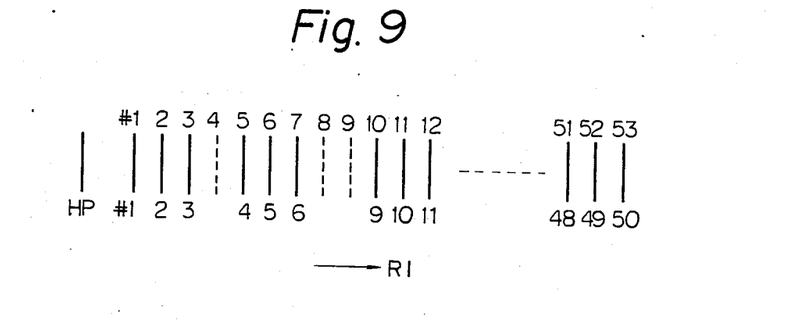

In more detail, FIGS. 7-9 show the tracks which are effectively recorded with signals and the tracks skipped by the real and dotted lines, respectively. When moving the magnetic head 26 from the home position HP thereof in the forward direction R1, the playback device 100 identifies as the track #1 a track for which a valid envelope is first detected. In these figures, the absolute addresses of the tracks are represented in numbers above the respective solid and dotted bars of the tracks, whereas the relative addresses of the valid tracks are indicated below the solid bars of the associated tracks.

As can be seen from these figures, as for the relative address, the playback device 100 sequentially counts only the valid tracks with reference to the track #1, beginning from the first track. That is, the relative addresses represents a value obtained by counting valid tracks, namely, an identification (number) of valid tracks. The absolute address in this embodiment is not defined as an absolute position measured from the home position HP but is a track position taken with reference to the track #1, that is, it is counted as a value associated with the distance of a track from the track #1.

In FIG. 7, for example, the track #1 is effective established at a track position considerably apart from the home position HP, and track positions indicated by absolute addresses #3 and #7 are skipped. Consequently, if there does not occur any other skip thereafter, the playback device 100 counts relative address #50 indicating the last track as absolute address #52.

In an example of FIG. 8, the track #1 is recorded at a position relatively in the neighborhood of the home position HP, and track positions represented by absolute numbers #4, #8, #10, and #59 are skipped. This apparatus 100 is so designed as to control the magnetic head 26 not to be moved beyond the absolute address 60, mechanical limit value, that is, maximum 60 track positions with reference to the track #1.

In an example of FIG. 9, although track positions #8 and #9 are consecutively skipped, which should not take place in a system in which the skip distance between tracks recorded with video signals is at most one track in the recording device as described above. These consecutively skipped tracks may be probable in such a case that a track at one of the absolute addresses #8 and #9 is valid and the track at the other address thereof is not recorded, with a signal dropout occurring on the one valid track, which is in turn skipped in the playback device 100.

The same condition also appears during a playback with a magnetic disk which has not been fully recorded up to the limit of the recording capacity thereof with respect to the number of tracks. With this disk installed in this apparatus 100, if an envelope is not detected for the consecutive two tracks when moving the head 26 in the forward direction R1, the apparatus 100 determines that the subsequent tracks thereto are not recorded, so that it does not further move the head 26.

The control of the absolute and relative addresses in the playback apparatus 100 is carried out by the controller 60. The operational flow sequences of the control will be described in reference to FIGS. 10A-10C. For this control, the controller 60, which may advantageously comprise a processor system, includes an absolute address counter for counting the absolute addresses, a relative address counter for counting the relative addresses, and a no-record flag for indicating a no-record state in which an envelope is not detected at a track position represented by an absolute address.

In accordance with the operation shown in FIG. 4, when the head 26 is located at the first track position, the no-record flag is set to "0" and the counters are set to "1" in the controller 60, step 500. The no-record flag is reset in response to that the head 26 is returned to the home position when the apparatus 100 gets powered or when the inner bucket is opened to install the magnetic disk package 200.

For example, if the FW key, FIG. 1, is depressed under this condition, namely, not in the "conceal mode" to be described later, then, since the no-record flag is "0" in this state, control is transferred to steps 514 and 516 in order to increment the relative and absolute addresses, steps 520 and 522, respectively, and to move the head 26 by 95 μm, step 524. That is, so long as a valid envelope is detected, step 526, the head 26 is sequentially located on a valid track, step 528, and the relatively address is displayed on the display device 48, step 530. If the valid envelope is detected in this fashion, this operation is repeated to increment the absolute address, step 522, together with the relative address, step 522.

On the other hand, when the head 26 approaches a no-record track, such as track position #3 shown in FIG. 7, since an erase carrier having a frequency higher than the recording carrier has been recorded on this track in this embodiment, the detect circuit 38 does not detect a valid envelope from the signals recorded on the track. Control thereof transfers from the decision step 526 via step 532 to a decision step 534. Since the no-record flag has been set to "0" in this case, it is set to "1", step 544, and control passes through steps 546, 548, and 522, then is transferred to an entry 4, thereby processing a program loop. This causes the head 26 to be further moved by 96 μm. Since the no-record flag has been set to 1 in this situation, the step 520 for incrementing the relative address is skipped to increment only the absolute address, step 522.

Under this condition, if a valid envelope is detected, the wobbling control is effected on the tracking (528), then control returns to the ordinary processing. Consequently, if only one track has been erased or has not been recorded, the operator can observe the next track only with a switch actuation; and hence the picture playback can be performed without his or her recognizing that the track has been erased or has not been recorded. However, when using a magnetic disk on which signals have not been recorded in the track areas beyond the absolute address #8, for example, or on which the signals have been erased on two consecutive tracks (absolute addresses #8 and #9 in FIG. 9), if a valid envelope is not detected also in this operation when the head 26 is positioned to the track area, control proceeds from entry 1 via a decision step 534 to step 536 because the no-record flag has been set to "1". Due to the head travel in the forward direction in this example, the head travel direction is reversed, step 538, to move the head 26 in the opposite direction. That is, the head 26 is not further moved in the no-record areas, and thus the playback operation is not conducted exceeding this extent.

Figure 10A:
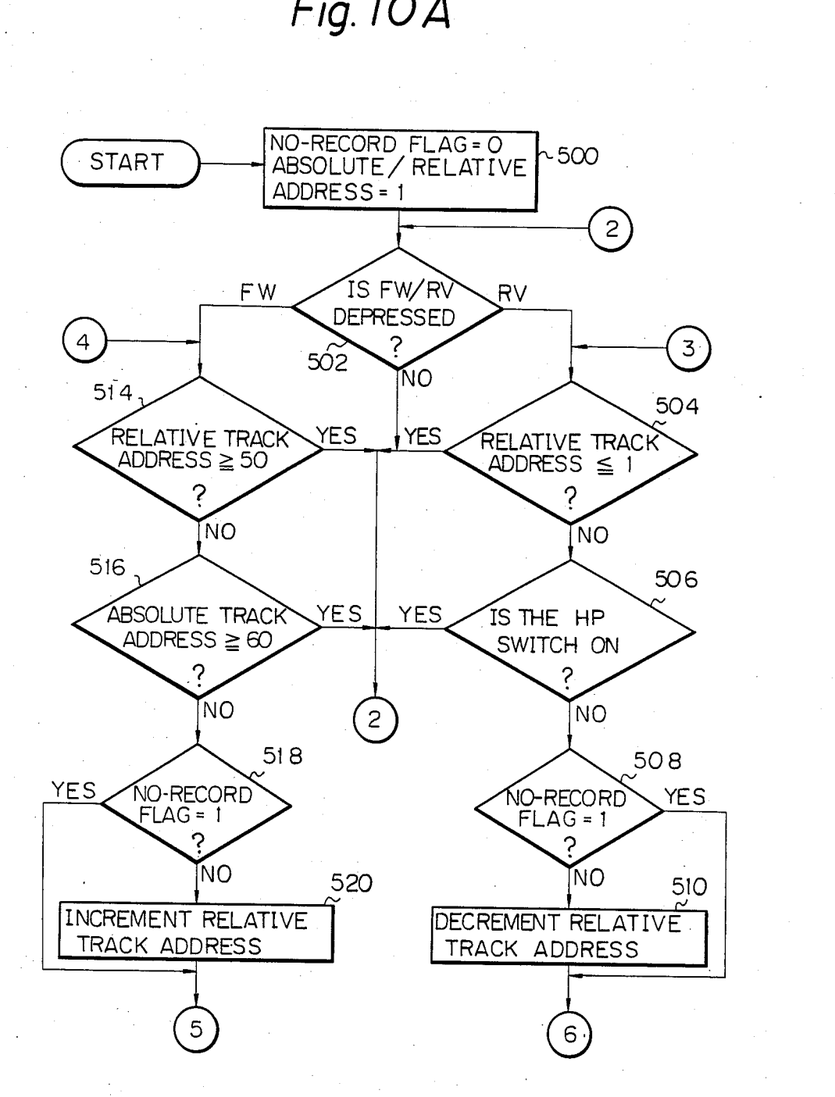
FIGS. 10A, 10B and 10C show the operational flows in the control unit of the embodiment shown in FIG. 1.
Figure 10B:
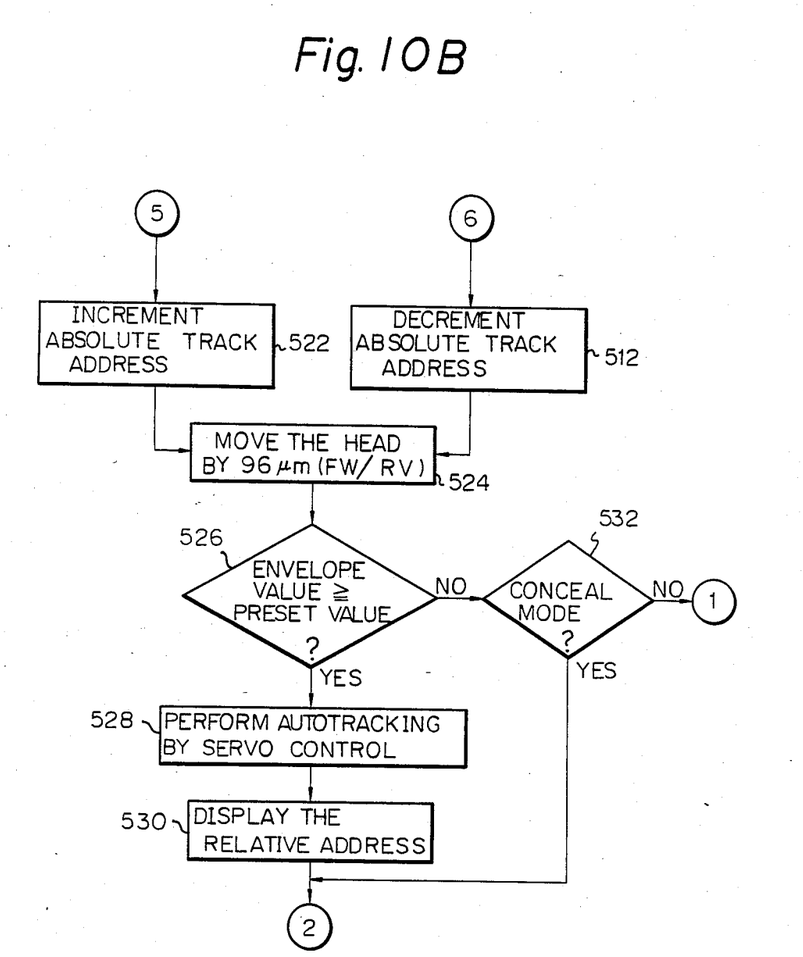
Figure 10C:
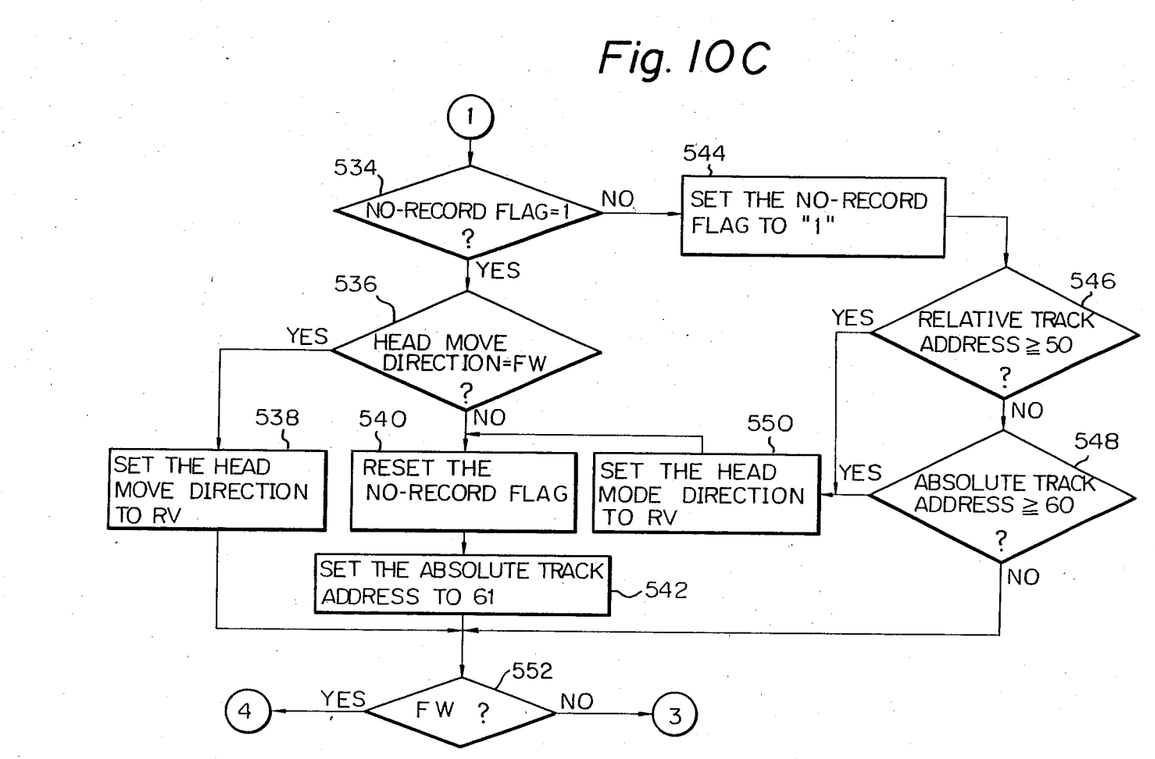

Control returns to the processing of FIG. 10A through entry 3 in order to decrement the absolute address, step 412, until a valid envelope is detected, step 526, thereby moving the head 26 in the reverse direction. For example, when the track areas beyond the absolute address #8 have not been recorded or if the signals have been erased at two consecutive absolute addresses #8 and #9 in this example, if an envelope having at least a predetermined level is not detected at these absolute addresses #8 and #9, either, step 526, then control passes through steps 532, 534, 536, 538, and 552 to return to the processing of FIG. 10A via the entry 3, then the head 26 is moved by a predetermined distance in the reverse direction, step 524, through steps 504, 506, 508 and 512, so as to detect an envelope on the track, step 526.

In this case, however, a valid envelope is not detected even when the head 26 is moved from the absolute addresses #9 to the absolute address, #8, so that control is transferred from step 532 to step 534, which is followed by step 536. Since the no-record flag contains "1" in this case, and the reverse direction has been specified in terms of the head travel direction, step 54 resets the no-record flag, and the absolute track address of the track on which the head 26 is currently positioned is set to "61", which is the absolute track number beyond which the head 26 is not moved. Thereafter, control passes through entry 3 and steps 504, 506, 508, 510, and 512 to further move the head 26 by the distance corresponding to a track in the reverse direction. In this manner, the head 26 is returned to the track next to the last track recorded or the consecutive two erased tracks, that is, the track #7 in this instance, and this state is retained until an FW or RV switch actuation is sensed after control is passed to the processing through entry 2 via steps 528 and 530.

As described above, if the track areas beyond a track have not been recorded or the signals have been erased on two consecutive tracks, the head 26 is automatically returned to the track immediately preceding the last track on which an envelope is detected or the consecutive erased tracks so as to reproduce signals recorded on the track. In this case, the correct relative track number, namely, track #6 associated with the absolute track #7 is displayed in the example of FIG. 9.

The operations described above also apply to the case in which the head 26 is moved to the reverse direction. Until the home position sense switch 330 is actuated, the head 26 is moved in response to the FW key by decrementing the absolute address, step 412, and further by decrementing the relative address if a valid envelope is detected, step 410.

In the "conceal mode", however, even if a valid envelope is not detected on two consecutive tracks, the head 26 is further moved to a track position beyond the tracks. This mode may be set by the controller 60 when a special operation is conducted, for example, when the inner bucket is closed while the display key of this apparatus is actuated. Alternatively, as shown in FIG. 1, the apparatus may be configured to enable the controller 60 to set the conceal mode when a special key, AV, for setting the conceal mode is actuated.

Even if a valid envelope is not detected on the consecutive tracks due to the conditions of the playback device or for some reasons, as is the case for the absolute addresses #8 and #9 of FIG. 9, control returns from step 426 to step 402 in the conceal mode. Consequently, if the FW key is further depressed, the head 26 can be advanced to a track beyond the track position. Although the controller 60 may display only the relative address on the display unit 48, the apparatus 100 may be so configured to display the absolute value in addition to, or in place of, the relative address.

In this embodiment as described hereabove, when the head 26 is moved to the maximum relative address 50 or the maximum absolute address 60, control branches from the decision step 546 or 548 in order to reverse the head travel direction to the opposite direction, step 550. In addition, when the no-record flag is reset, step 540, and the absolute address is set to "61", the FW key actuation is regarded as invalid. Consequently, the controller 60 does not move the head 26 exceeding the final track position (50 in this embodiment) or the limit value (60 in this embodiment) of the absolute address.

According to the playback apparatus for a rotary recording medium of the present invention, when a track on which signals have been effectively recorded is not detected successively for a predetermined number of tracks, the direction of the magnetic head travel is reversed. Consequently, a desired picture can be appropriately selected without causing the playback head 26 to be continuously moved to an unrecorded track area on a magnetic disk 10, thereby efficiently reproducing the picture.

In accordance with the present invention, when a predetermined number of tracks are sensed on which valid signals are not recorded, the magnetic head is reversed in its travelling direction. This allows appropriate pictures to be selected without transferring the magnetic head into the area which includes no valid recording. Effective reproduction of pictures will be accomplished in playback operation.

While the present invention has been described with reference to the particular illustrative embodiment, it is not to be restricted by the embodiment but only by the appended claims. It is to be appreciated that those skilled in the art can change or modify the embodiments without departing from the scope and spirit of the present invention.

What is claimed is:

1. Playback apparatus for a rotary recording medium comprising:

playback head means for sensing signals from a plurality of tracks which are recorded on a rotary recording medium in such a manner that a front end of recording operation positionally continues to a last end thereof;

head move means for movably supporting said playback head means over said recording medium;

envelope detect means for detecting an envelope of signals sensed by said playback head means; and control means, operative in response to said envelope detect means, for controlling said head move means to move said playback head means onto a desired one of the plurality of tracks on the basis of the detected envelope;

said control means, while controlling said head move means to move said playback head means in a first direction, determining the distance over which said playback head has moved with reference to a first predetermined reference position;

said control means controlling said head move means to move said playback head means in a second direction opposite to the first direction when an envelope of signals is not detected by said envelope detect means at a predetermined number of successive track positions and then inhibiting said head move means from moving said playback head means into an area in which a track is not recorded.

2. Playback apparatus according to claim 1 wherein said control means controls said head move means to continue to move said playback head means in the second direction up to a track for which a valid envelope is directed.

3. Playback apparatus according to claim 1 wherein said predetermined number of successive track positions is two.

4. Playback apparatus according to claim 1 wherein said control means, is operative under a specific mode to move said playback head means in the first direction even if an envelope of signals is not detected successively for a number of track positions corresponding to the predetermined number of successive tracks positions.

5. Playback apparatus according to claim 1 wherein said control means, in response to said envelope detect means failing to detect an envelope at successive track positions corresponding to the predetermined number of tracks, memorizes a track position in which said envelope detect means detects a last, valid envelope of signals occurring before said successive track positions at which an envelope of signals is not detected in order to prevent said playback head means from being moved into the area in which a track is not recorded.

6. Playback apparatus according to claim 1 wherein the first reference position is on a first track on which said envelope detect means first detects an envelope when said head move means moves said head means in the first direction a second reference position being located at a position that precedes said reference position with respect to the first direction, said control means, in response to said envelope detect means failing to detect an envelope at successive track positions corresponding to the predetermined number of tracks, controlling said head move means to move said playback head means in the second direction to the second reference position, and then a moving said playback head means in the first direction to return said head means to the first reference position.

7. Playback apparatus according to claim 6 wherein said control means determines the distance over which said playback head means has moved with reference to the first reference position in the form of the number of track positions in the first direction, said control means controlling said head move means to inhibit said playback head means from moving a distance that exceeds a distance corresponding to a predetermined maximum number of track positions.

8. Playback apparatus according to claim 1 wherein said rotary recording medium comprises a rotary magnetic recording medium.

9. Playback apparatus according to claim 8 wherein said rotary magnetic recording medium is a magnetic recording disk having a track on which there is recorded a field of video signals including luminance, chroma and synchronous signals modulated in frequency.

10. Playback apparatus according to claim 9 further comprising reproducing means interconnected to said playback head means for demodulating the video signals sensed by said head means to develop the video signals.

* * * * *